United States Patent [19]

Cowley et al.

[11] 4,010,112
[45] Mar. 1, 1977

[54] PRODUCTION OF AQUEOUS SOLUTIONS OF CHLORINE DIOXIDE AND CHLORINE

[75] Inventors: Gerald Cowley; Maurice C. J. Fredette, both of Mississauga, Canada

[73] Assignee: Erco Industries Limited, Islington, Canada

[22] Filed: Oct. 20, 1975

[21] Appl. No.: 623,773

[30] Foreign Application Priority Data

Sept. 18, 1975 Canada .................. 235827

[52] U.S. Cl. .................. 252/187 R; 55/71
[51] Int. Cl.² .................. C01B 11/02
[58] Field of Search ............... 252/187 R; 423/477; 55/71

[56] References Cited

UNITED STATES PATENTS

| 3,524,728 | 8/1970 | Westerlund | 252/187 R |
| 3,760,065 | 9/1973 | Rapson | 252/187 R |
| 3,829,557 | 8/1974 | Winfield | 252/187 R |
| 3,854,900 | 12/1974 | Upatnieks et al. | 55/71 |
| 3,854,901 | 12/1974 | Cowley | 55/71 |

Primary Examiner—Padgett Benjamin R.
Assistant Examiner—Deborah L. Kyle
Attorney, Agent, or Firm—Sim & McBurney

[57] ABSTRACT

Gaseous mixtures of chlorine dioxide, chlorine, steam and air are contacted with water to dissolve all the chlorine dioxide values and part of the chlorine values therefrom. The resulting mixture of chlorine and air is compressed and the compressed gas is introduced to the aqueous chlorine dioxide and chlorine solution to increase the amount of chlorine relative to chlorine dioxide absorbed in the solution. The resulting solution is used in pulp bleaching operations. Considerable water utilization savings are achieved by this procedure.

29 Claims, 4 Drawing Figures

PRODUCTION OF AQUEOUS SOLUTIONS OF CHLORINE DIOXIDE AND CHLORINE

FIELD OF INVENTION

This invention relates to the preparation of aqueous solutions of chlorine dioxide and chlorine from gaseous mixtures thereof.

BACKGROUND TO THE INVENTION

Chlorine dioxide, which is used in bleaching operations, typically in the bleaching of cellulosic fibrous material pulps, may be formed in many different ways, generally involving the reduction of a chlorate by a chloride in an acid medium in accordance with the equation:

$$ClO_3^- + Cl^- + 2H^+ \rightarrow ClO_2 + \tfrac{1}{2} Cl_2 + H_2O$$

Commonly, the formation of chlorine dioxide involves the reduction of an alkali metal chlorate with an alkali metal chloride in an acid medium containing sulphuric acid or other strong mineral acid. In this process, where the alkali metal is sodium, the reaction is represented by the equation:

$$NaClO_3 + NaCl + H_2SO_4 \rightarrow ClO_2 + \tfrac{1}{2} Cl_2 + H_2O + Na_2SO_4$$

An alternative process involves the reduction of the alkali metal chlorate in hydrochloric acid, the hydrochloric acid providing both the reductant and the acid medium. This process, where the alkali metal is sodium, is represented by the equation:

$$NaClO_3 + 2HCl \rightarrow ClO_2 + \tfrac{1}{2} Cl_2 + H_2O + NaCl$$

The gaseous chlorine dioxide produced in these processes, therefore, is obtained in admixture with chlorine. In view of the explosive nature of chlorine dioxide gas at high partial pressures, the gaseous mixture of chlorine dioxide and chlorine usually is diluted with an inert gas, such as air and/or steam.

Steam dilution may be achieved by maintaining the reaction mixture at its boiling point with the reaction vessel under a subatmospheric pressure. Typical processes are described in Canadian Pat. Nos. 825,084, 826,577 and 913,328.

Chlorine dioxide is used for bleaching as aqueous solution thereof, such as, in the typical bleach plant sequence $D_CEDED$ or $C_DEDED$, where D represents bleaching with chlorine dioxide solution, $D_C$ represents bleaching with an aqueous solution of chlorine dioxide and chlorine in which chlorine dioxide provides at least 50 percent of the available chlorine of the aqeuous solution, $C_D$ represents bleaching with an aqueous solution of chlorine dioxide and chlorine in which chlorine dioxide provides less than 50 percent of the available chlorine of the aqueous solution, and E represents caustic extraction with aqueous sodium hydroxide solution.

One conventional manner of treating the gas mixture resulting from the chlorine dioxide generator is to contact it with water to absorb all the chlorine dioxide and some of the chlorine and to separately recover the remaining chlorine. The separated chlorine then is separately absorbed in water. These solutions then are later combined to provide a chlorine dioxide and chlorine solution containing the desired relative proportions of chlorine dioxide and chlorine for use in the first bleaching stage. Due to the sparing solubility of both chlorine dioxide and chlorine in water, the addition of the chemicals to the bleach plant is accompanied by large volumes of water, which later have to be treated as an effluent or evaporated in an effluent free mill system.

In this prior art absorption procedure, the water contacting the gaseous mixture and dissolving the chlorine must be chilled, typically to below about 50° F, while the aqueous chlorine dioxide and chlorine solution used in the first bleaching stage must be warmed for effective bleaching. Thus, the larger volume of carrier water used with the chemicals fed to the bleach plant, the higher are the energy requirements.

SUMMARY OF INVENTION

In the present invention, the gaseous mixture of chlorine dioxide and chlorine is treated in such a way that the volume of water carrying the chlorine dioxide and chlorine used in the bleach plant is considerably decreased, resulting in considerable savings in steam and power requirements, product storage capacity, effluent volume, water usage and capital investment.

In the present invention, gaseous mixtures of chlorine dioxide and chlorine are contacted with water to dissolve all the chlorine dioxide values therefrom and part of the chlorine values therefrom, the partial pressure of chlorine in the residual gas is increased as compared with that in the initial gaseous mixture, and the chlorine gas stream of increased partial pressure is contacted with the aqueous solution of chlorine dioxide and chlorine formed in the first contacting step to dissolve chlorine therein and thereby enrich the concentration of chlorine in the aqueous solution of chlorine dioxide and chlorine.

DESCRIPTION OF PREFERRED EMBODIMENTS

Figure 1:
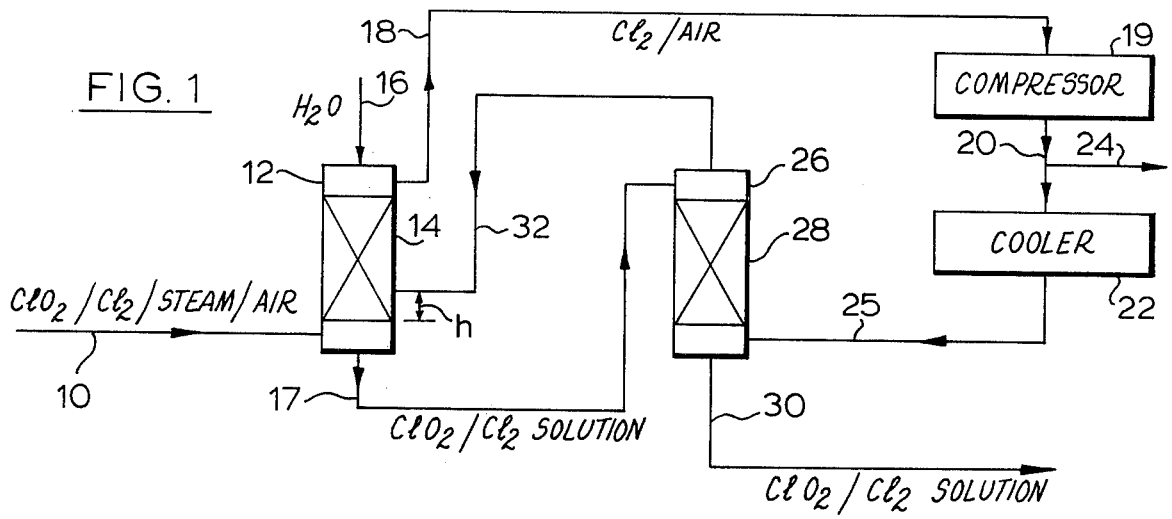
FIG. 1 is a schematic flow sheet of one embodiment of the invention.

Referring first to the embodiment of FIG. 1, a gaseous mixture of chlorine dioxide, chlorine, steam and inert gas, typically air, is fed by line 10 to a first gas-liquid contact tower 12. The gaseous mixture in line 10 typically is formed by generating chlorine dioxide and chlorine in accordance with the procedures outlined in Canadian Pat. Nos. 825,084, 826,577 and 913,328 at the boiling point of the reaction medium while the reaction vessel is maintained under a subatmospheric pressure. Air is bled into the reaction vessel to control the absolute pressure therein, typically in the range 100 to 250 mm Hg, and there exits from the reaction vessel a gaseous mixture of chlorine dioxide, chlorine, steam and air. This gaseous mixture then is cooled to condense at least part of the steam therefrom, so as to control the rise in temperature of the aqueous media in the first gas-liquid contact tower 12.

The first gas-liquid contact tower 12 contains a first gas-liquid contact zone 14 of any convenient type to achieve intimate countercurrent gas-liquid contact. The first gas-liquid contact zone 14 is maintained under the same subatmospheric pressure as the chlorine dioxide generator vessel.

The gas mixture rises through the first gas-liquid contact zone 14 and is countercurrently contacted by an aqueous solution of chlorine dioxide and chlorine. The latter solution is provided by the dissolving of chlorine dioxide and chlorine in higher stages of zone 14 in water fed by line 16 to the tower 12 at the top of the first gas-liquid contact zone 14 during passage thereof downwardly through the zone 14. The water may be fed to the tower 12 by line 16 in any convenient manner, typically through spray nozzles. The water typically has a temperature below about 50° F, such as about 40° F.

The aqueous solution of chlorine dioxide and chlorine contacting the gaseous mixture in the lower portion of the zone 14 dissolves chlorine dioxide from the gaseous mixture while releasing chlorine therefrom. At the same time condensation of water vapor from the gaseous mixture occurs, resulting in an increase in the temperature of the solution and a corresponding increase in the partial pressures of chlorine dioxide and chlorine. This temperature rise typically is about 5° to 10° F and is determined by the quantity of steam in the gas mixture fed by line 10, which in turn is determined by the degree of condensation of steam from the gas mixture emanating from the chlorine dioxide generator prior to passage to the first tower 12.

The dissolving of the chlorine dioxide and the release of chlorine from the aqueous solution phase occurs due to the following phenomena. Since the contact zone 14 is operating under a subatmospheric pressure and chlorine dioxide is dissolved by the condensed water vapor and the existing aqueous phase more quickly than chlorine, the removal of chlorine dioxide from the vapor phase by absorption in the condensed water vapor and the existing aqueous phase increases the partial pressure of chlorine in the vapor phase.

Therefore, as the first gas-liquid contact zone 14 is ascended, the mass rate of solution of chlorine increases due to its increasing partial pressure while the mass rate of solution of chlorine dioxide decreases.

At some height in the zone 14, therefore, chlorine vapor is in equilibrium with the liquid phase, and hence, at points below this level chlorine is stripped out of the aqueous phase while chlorine dioxide is dissolved in the aqueous phase due to the lower partial pressure of chlorine than the theoretical equilibrium at the higher level.

Figure 4:
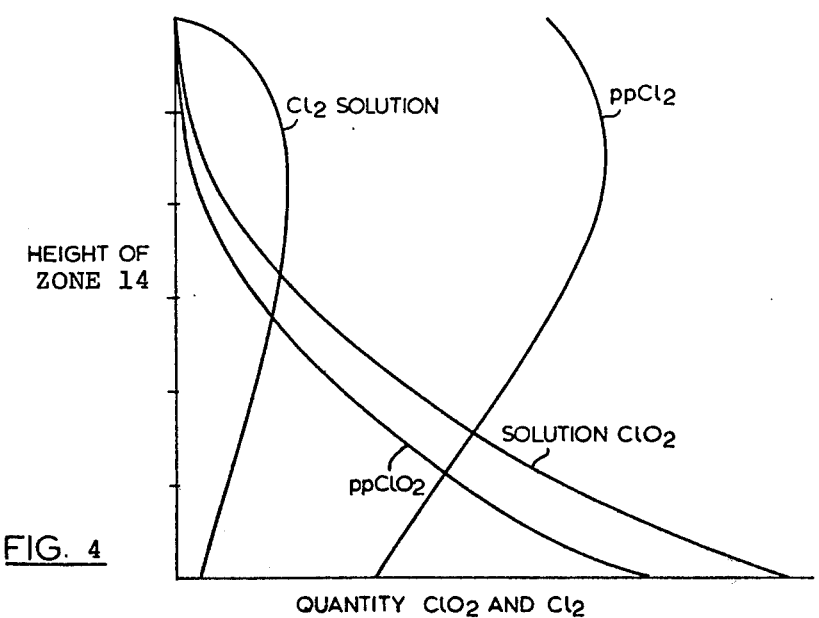
FIG. 4 is a graph illustrating the partial pressures and concentration of chlorine dioxide and chlorine in the first contact tower used in the embodiments of FIGS. 1 to 3.

FIG. 4 illustrates the variation of partial pressure and concentration of both chlorine dioxide and chlorine as the first gas-liquid contact zone 14 is ascended. It will be seen from this graph and as discussed in more detail above, that the concentration of chlorine dioxide in the aqueous phase decreases with increasing height, paralleling a similar decrease in partial pressure of chlorine dioxide in the gaseous phase. In contrast, the concentration of chlorine in the aqueous phase increases with increasing height of zone 14 paralleling an increase in the partial pressure of chlorine in the gaseous phase up to a point where the gaseous phase and the aqueous phase are in equilibrium. Above this equilibrium point, partial pressure and concentration of chlorine both fall.

The aqueous solution of chlorine dioxide and chlorine resulting from the countercurrent contact in the first zone 14 and leaving the tower 12 by line 17 contains dissolved chlorine in a concentration corresponding to the solubility of chlorine in the aqueous solution under the prevailing conditions of concentration of chlorine dioxide and temperature of the solution and pressure on the system.

In the first gas-liquid contact zone 14, substantially all the chlorine dioxide content of the gaseous mixture fed by line 10 is dissolved therefrom and is present in the chlorine dioxide solution in line 17.

The concentration of chlorine dioxide present in the aqueous solution in line 17, depends on the flow rates of water in line 16 and the gaseous mixture in line 10.

The chlorine dioxide-free gaseous mixture of chlorine and air exiting from the top of the tower 12 by line 18 is passed to a compressor 19 wherein the partial pressure of chlorine is increased relative to that in the initial gaseous mixture in line 10. The compressor 19, of any convenient construction serves to maintain the first gas-liquid contact zone 14 and thereby the chlorine dioxide generator vessel under the desired subatmospheric pressure. The absolute pressure of the gas mixture on the downstream side of the compressor 19, therefore, exceeds the subatmospheric pressure of the first gas-liquid contact zone 14 and preferably corresponds to atmospheric pressure.

The compressed chlorine is passed by line 20 to a cooler 22 for cooling of the compressed gas mixture. The cooler may be omitted if the compressor 19 does not take the form of steam ejector, depending on the temperature of the gaseous mixture leaving the first tower 12, the relative pressures of the upstream and downstream sides of the compressor 19 and the absolute concentrations of chlorine dioxide and chlorine desired in the final solution. It is preferred to balance the parameters of pressure difference and temperature to maintain only a minimum change in pressure between the upstream and downstream sides of the compressor.

Where such cooling is carried out, the temperature of operation of the second contact zone 28 is maintained above the temperature of formation of chlorine hydrate at the prevailing concentrations.

A chlorine purge line 24 is provided for purging a desired proportion of the chlorine in line 20 from the system. The chlorine purge is used to remove the proportion of the total chlorine which may not be capable of being dissolved in the chlorine dioxide and chlorine solution in line 17 under the prevailing conditions and chlorine dioxide concentration desired in the final chlorine dioxide and chlorine solution.

The proportion of chlorine purged by line 24 is only a minor proportion of the total chlorine of the gaseous mixture in line 10, typically les than 10% by volume. The chlorine purged in this way may be separately dissolved in water and later combined with the final chlorine dioxide and chlorine solution produced by the procedure of this embodiment so that the purged chlorine values are present in the resulting solution. The chlorine purge in line 24 also serves to purge air from the system.

Alternatively, the purged chlorine may be absorbed in the sodium hydroxide solution used in the first and second caustic extraction stages, so that the chlorine values are introduced to the bleach plant while the introduction of additional water is avoided.

An additional alternative is to absorb the purged chlorine in sodium hydroxide solution and feed the hypochlorite solution so formed to the first bleaching stage.

A further alternative is to react the purged chlorine with hydrogen and use the resulting hydrogen chloride elsewhere in the pulp mill, such as in the chlorine dioxide generator.

In place of a chlorine purge in line 24, additional compressed chlorine, such as from a parallel chlorine dioxide generation operation, may be fed into the chlorine and air gas mixture in line 20.

The remainder of the compressed chlorine is fed by line 25 to the lower end of a second gas-liquid contact tower 26 containing a second gas-liquid contact zone 28 of any convenient construction for allowing intimate countercurrent gas-liquid contact. The second gas-liquid contact zone has a pressure corresponding to the pressure on the downstream side of the compressor 19, typically atmospheric pressure.

It is preferred for the chlorine gas in line 25 to have substantially the same temperature as the chlorine dioxide solution in line 17, namely about 45° F.

The aqueous solution of chlorine dioxide and chlorine in line 17 is forwarded to the top of the second tower 26 for contact with the chlorine fed by line 25. As the aqueous solution of chlorine dioxide and chlorine moves downwardly through the second gas-liquid contact zone 28, it is subjected to countercurrent contact with the rising stream of chlorine and air.

Since the chlorine is at a higher partial pressure in the second zone 28 than in the first zone 14, further chlorine is absorbed by the solution with some chlorine dioxide being stripped off. The resulting chlorine-enriched aqueous solution of chlorine dioxide and chlorine is removed from the second tower 26 by line 30.

The additional concentration of chlorine dissolved in the aqueous solution depends on the initial concentration therein, the difference in partial pressure of chlorine in the contact zones 12 and 28, the temperature of the contact zone 28, the relative flow rates of the gaseous and aqueous phases and the height of the contact zone 28. By controlling these parameters, up to the limits of solubility of chlorine and chlorine dioxide, any relative proportion of chlorine to chlorine dioxide in the solution in line 30 may be achieved.

The gaseous mixture of chlorine dioxide, chlorine and air resulting from the gas-liquid contact zone 28 is recycled by line 32 to the first tower 12 and is fed thereto at a height h in the first gas-liquid contact zone 14 corresponding to the height in the contact zone 14 at which the relative proportions of chlorine dioxide and chlorine are the same as the value of the relative proportions of chlorine dioxide and chlorine in line 32, so that the introduction of the gas mixture in line 32 to the contact zone 14 does not substantially affect the gas phase-liquid phase equilibrium existing in zone 14 at that point.

Part or all of the gas mixture in line 32 may be recycled to the chlorine dioxide generator, as illustrated below in FIG. 3. In this case, the air contained in line 32 provides at least part of the inert gas requirement of the chlorine dioxide generator, where no chlorine is purged and hence no air is purged from the system by line 24, the gas mixture in line 32 is required to be recycled to the generator to prevent the build up of air in the system. In this case, other than to compensate for leaks, the air circulates in a closed loop and an external feed is not required.

Where the gas mixture in line 32 is wholly cycled to the chlorine dioxide generator and chlorine and air are purged by line 24, external air is required to the extent necessary only to compensate for the air purged by line 24.

Where all the chlorine in line 25 is not required to be passed to the second tower 26, part of the chlorine in line 25 may be recycled to the chlorine dioxide generator to act as additional diluent gas for the chlorine dioxide. Such chlorine recycle typically may be made in conjunction with recycle of all or part of the gaseous mixture of chlorine dioxide, chlorine and air in line 32 to the chlorine dioxide generator.

Alternatively, part of the chlorine gas in line 25 may be cycled to the first contact zone 14, such as with the gaseous mixture in line 32.

The first gas-liquid contact zone 14 is illustrated as a single continuous gas-liquid contact zone since it is preferred to operate in this manner. If desired, however, the first contact zone 14 may be separated into two sections, with the split occurring at height h therein.

In this embodiment of the invention, therefore, an aqueous solution of chlorine dioxide and chlorine is formed from the initial gaseous mixture fed by line 10 and contains a higher proportion of chlorine than is obtainable by simple absorption of the gases in water. Since the system described in FIG. 1 is balanced, with the exception of the purge in line 24, the chlorine dioxide and chlorine solution in line 30 contains all the chlorine dioxide of the initial gas mixture in line 10 and all the chlorine of the initial gas mixture in line 10 less the quantity purged by line 24.

Since the bulk or all of the chlorine gas in line 18 is absorbed in the chlorine dioxide and chlorine solution in line 17 rather than in a separate aqueous medium, the feed of the aqueous solution in line 30 to the bleach plant, typically for use in the first bleaching stage, results in a substantially decreased volume of water passing with the chlorine dioxide and chlorine bleaching chemicals to the first stage, thereby decreasing the volume of effluent to be handled, and decreasing the volume of chilled water required for absorption and the volume of solution required to be heated prior to use in the bleach plant.

In the embodiment of FIG. 1, all the aqueous solution of chlorine dioxide and chlorine in line 17 is passed to the second tower 26 for absorption of chlorine therein to produce the chlorine-enriched aqueous solution of chlorine dioxide and chlorine in line 30 suitable for use in the first bleaching stage of a bleach plant. It is contemplated that such an operation would be used in a situation where a separate chlorine dioxide-producing operation capable of producing substantially chlorine-free chlorine dioxide is used, or a plurality of such operations is used, to form aqueous chlorine dioxide solutions having a low chlorine concentration for use in the second and third bleaching stages of a $C_D$EDED or a $D_C$EDED bleaching sequence.

In circumstances when the aqueous solution of chlorine dioxide and chlorine in line 17 has a chlorine concentration which can be tolerated in chlorine dioxide solutions used in the second and third bleaching stages, it is possible to use a single chlorine dioxide generator producing all the chlorine dioxide requirement of the bleach plant, part of the chlorine dioxide and chlorine solution in line 17 being fed directly to the second and third bleaching stages while the remainder of the solution in line 17 is fed to the second tower 26 for chlorine enrichment, the chlorine-enriched solution of chlorine dioxide and chlorine in line 30 being used in the first bleaching stage.

Where, however, the concentration of chlorine in the chlorine dioxide and chlorine solution in line 17 is greater than that tolerable in the latter bleaching stages of the bleach plant, then a chlorine-stripping operation may be carried out on that proportion of the chlorine dioxide and chlorine solution which is required in those bleaching stages to deplete the chlorine concentration therein.

Figure 2:
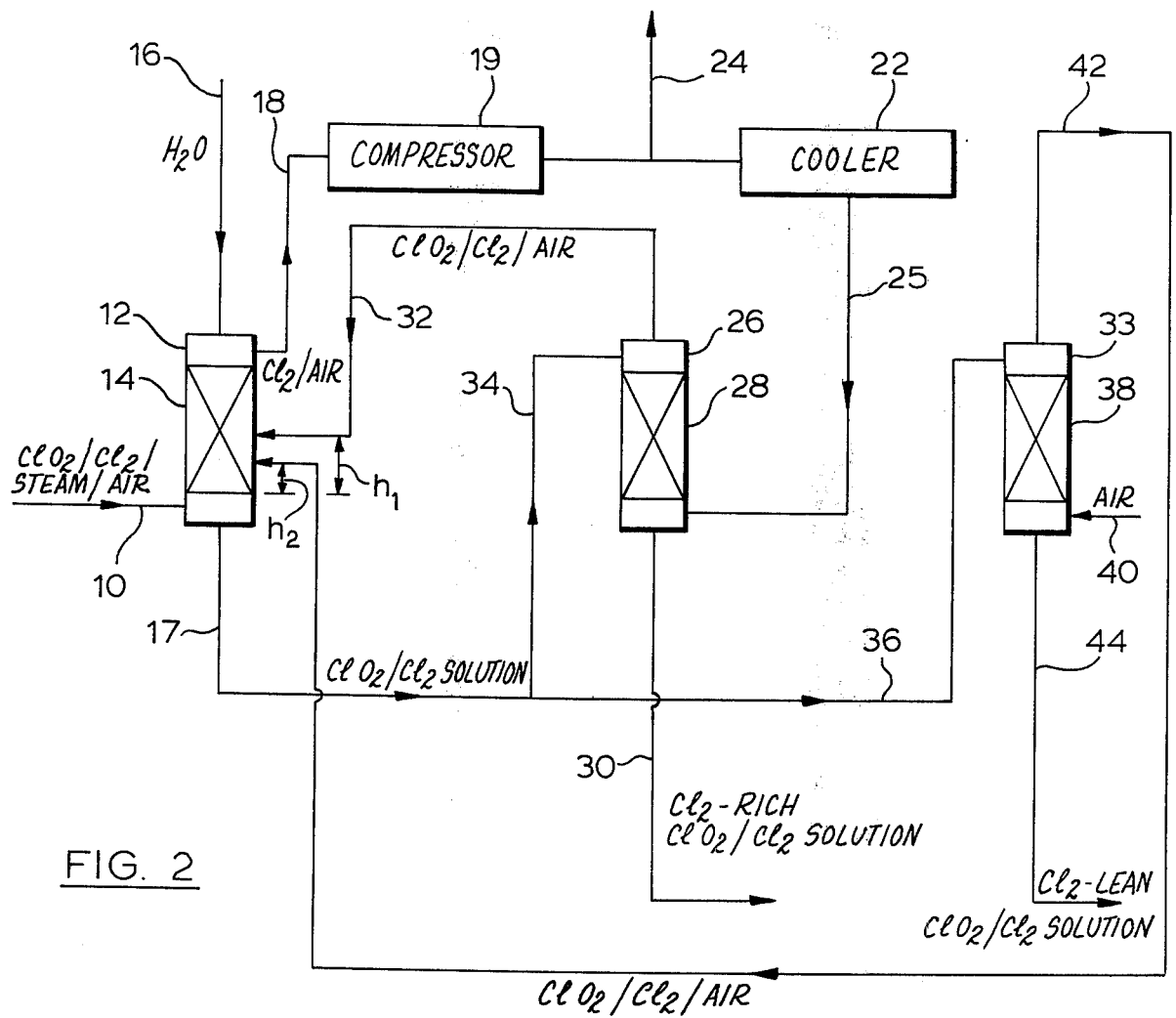
FIG. 2 is a schematic flow sheet of a second embodiment of the invention.

Such a chlorine-stripping operation is illustrated in the embodiment of FIG. 2. In this embodiment like items to those appearing in FIG. 1 have been designated by like reference numerals.

An additional gas-liquid contact tower 33 is included and the aqueous solution of chlorine dioxide and chlorine in line 17 recovered from the first tower 12 is split between the second tower 26, with feed thereto by line 34, and the third tower 33, with feed thereto by line 36.

The third gas-liquid contact tower 33 contains a third gas-liquid contact zone 38 of any convenient construction for allowing intimate countercurrent gas-liquid contact.

As the aqueous solution of chlorine dioxide and chlorine moves downwardly through the third gas-liquid contact zone 38, it is subjected to countercurrent contact with a rising stream of air or other inert gas fed to the tower 33 by line 40. Chlorine dioxide and chlorine both are stripped from the solution by the air and hence a gaseous mixture of chlorine dioxide, chlorine and air is removed from the top of the tower 33 by line 42.

Since the quantity of chlorine dioxide in solution in line 36 is considerably greater than the quantity of chlorine, stripping both chlorine dioxide and chlorine in the third gas-liquid contact zone 38 has the effect of decreasing the absolute concentration of both chlorine dioxide and chlorine in the aqueous phase, thereby resulting in an aqueous chlorine dioxide solution leaving the base of the tower 33 by line 44 containing only a low proportion of dissolved chlorine, the proportion of the chlorine depending on the quantity of inert gas, temperature of operation of the zone 38, concentration of chlorine dioxide desired in the solution in line 44, the initial concentrations of chlorine dioxide and chlorine in the solution in line 36 and the height of the third zone 38.

It is preferred to operate the third zone 38 at as low a temperature as possible, preferably below about 50° F, but at the same time it is essential that the third zone 38 operate at a temperature which is greater than the temperature of the first zone 14.

The gaseous mixture of chlorine dioxide, chlorine and inert gas in line 42 is recycled to the first tower 12 for feed to the first contact zone 14 at a height $h_2$ therein, corresponding to the height in the contact zone 14 at which the relative proportions of chlorine dioxide and chlorine are the same as the value of the relative proportions of chlorine dioxide and chlorine in the gas mixture in line 42. Similarly, the gas mixture in line 32 is recycled to the first tower for feed to the first contact zone 14 at a height $h_1$ therein above the feed level of line 42 and corresponding to the height in the contact zone 14 at which the relative proportions of chlorine dioxide and chlorine are the same as the value of the relative proportions of chlorine dioxide and chlorine in the gas mixture in line 32.

The introduction of the gaseous mixtures of lines 32 and 42 to the first contact zone 14 does not substantially affect the gas phase-liquid phase equilibria existing in the contact zone 14 at the respective points of introduction.

In common with the embodiment of FIG. 1, while the first gas-liquid contact zone 14 is illustrated as a single gas-liquid contact zone, it is possible to separate the first contact zone 14 into three sections, with the splits occurring at heights $h_1$ and $h_2$ therein. It is preferred, however, to have a single continuous gas-liquid contact zone 14 as illustrated.

The embodiment of FIG. 2 thus produces a chlorine-enriched solution of chlorine dioxide and chlorine in line 30 and a chlorine-lean solution of chlorine dioxide and chlorine in line 44, including, in combination, all the chlorine dioxide and chlorine contained in line 10, less any chlorine purged from the system by line 24.

The concentrations of the chemicals in the two solutions in lines 30 and 44 may be controlled by appropriate choice of the various parameters discussed above and by varying the proportion of the aqueous solution of chlorine dioxide and chlorine in line 17 fed by line 34 to the second tower 28 and fed by line 36 to the third tower 33.

The chlorine-enriched solution in line 30 may be used to provide the bleaching solution in the first stage of the bleach plant while the chlorine-lean solution in line 44 is used to provide the bleaching solution in the second and third bleaching stages of the bleach plant.

Since the water volume carrying the chlorine dioxide and chlorine to the bleach plant in the solutions in lines 30 and 44 is substantially less than the volume of water conventionally used to feed the chemicals to the bleach plant, considerable economic benefits arise, as discussed in more detail above, as compared with conventional operations.

The purge of chlorine by line 24 typically is necessary in this embodiment, due to the limited solubility of chlorine in the proportion of the aqueous chlorine dioxide and chlorine solution in line 34. The separate dissolving of this purged chlorine in water and later combination thereof with the chlorine-enriched solution in line 30 does not substantially increase the overall water requirement, which is still a substantial saving over the prior art arrangement in which all the chlorine in line 18 was separately dissolved in water prior to combination with at least part of the chlorine dioxide solution in line 17 for feed to the first bleaching stage.

As mentioned above in connection with the embodiment of FIG. 1, the gaseous mixture of chlorine dioxide, chlorine and air in line 32 may be recycled to the chlorine dioxide generator rather than to the first tower 12. The embodiment of FIG. 3 illustrates operation in this manner. Where like items to those specified in FIGS. 1 and 2 are employed, like reference numerals have been adopted.

Figure 3:
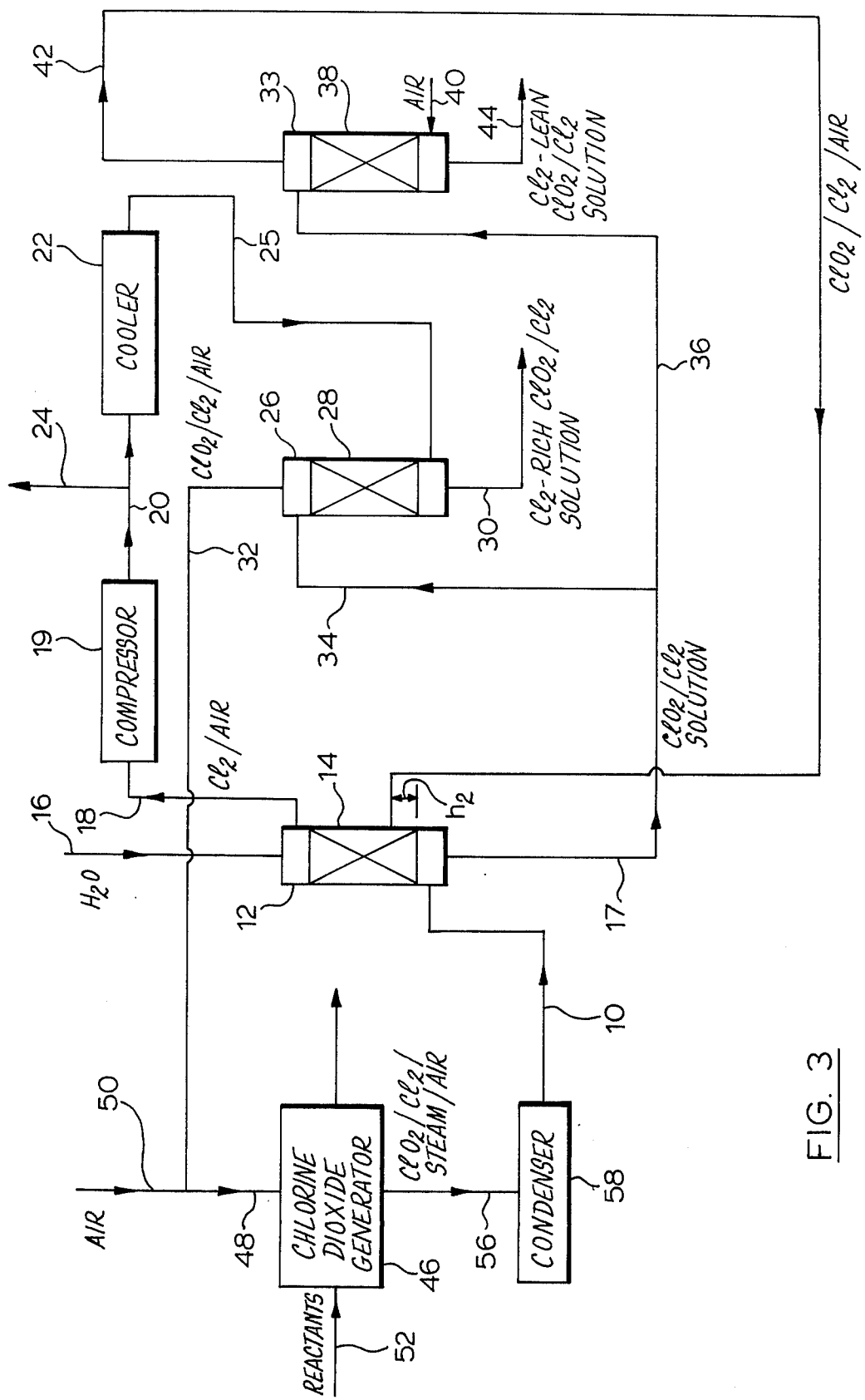
FIG. 3 is a schematic flow sheet of a modification of the embodiment of FIG. 2.

In the embodiment of FIG. 3, the gaseous mixture of chlorine dioxide, chlorine and air in line 32 is fed to a chlorine dioxide generator 46 by line 48 after augmentation with additional air fed by line 50 to compensate for air vented by line 24 or lost through leaks.

Reactants are fed to the chlorine dioxide generator 46 by line 52 and solid by-products are removed by line 54. The reactants in line 52 include sodium chlorate, a reducing agent and an acid while the solid product in line 54 is the sodium salt of the anion of the acid. One of the procedures outlined in the aforementioned Canadian Pat. Nos. 825,084 826,577 or 913,328 may be used in the chlorine dioxide generator 46.

A gaseous mixture of chlorine dioxide, chlorine, steam and air passes out of the generator 46 by line 56 for passage to a condensor 58 in which steam is condensed from the gaseous mixture to the extent required. The resulting gaseous mixture is that fed to the first tower 12 by line 10.

EXAMPLE

An apparatus was set of the type illustrated in FIG. 1 having a pressure of 180 mm Hg in the tower 12. A mixture of chlorine dioxide, chlorine, steam and air containing 53.19 mm Hg of chlorine dioxide and 29.295 mm Hg of chlorine was fed by line 10 to the base of zone 14 having ten theoretical stages. Water was fed by line 16 to the tower 12 at a temperature of about 40° F. and an aqueous solution was recovered in line 17 containing about 11 gpl chlorine dioxide and about 2.4 gpl chlorine.

Chlorine and air removed from the tower 12 by line 18 were compressed to a higher pressure, prior to feed of the compressed gases to the bottom of the tower 26. The aqueous solution of chlorine dioxide and chlorine in line 17 was fed to the top of the tower 26 for countercurrent contact with the compressed gases. An aqueous solution containing about 10 gpl chlorine dioxide and about 7 gpl chlorine was recovered in line 30.

SUMMARY

The present invention, therefore, provides a versatile and flexible way of providing aqueous chlorine dioxide and chlorine solutions having the desired concentrations of the chemicals and in which the volume of aqueous medium fed to a bleach plant in bleaching operation is considerably diminished. Modification are possible within the scope of the invention.

We claim:

1. A method of forming an aqueous solution of chlorine dioxide and chlorine from a gaseous mixture thereof, which comprises:
    contacting a gaseous mixture of chlorine dioxide and chlorine with water to dissolve all the chlorine dioxide therefrom and part of the chlorine therefrom to form an aqueous solution of chlorine dioxide and chlorine,
    recovering gaseous chlorine substantially free from chlorine dioxide from said contacting step,
    increasing the partial pressure of said gaseous chlorine to a value exceeding that of chlorine in said gaseous mixture of chlorine dioxide and chlorine to provide chlorine of increased partial pressure,
    contacting said aqueous solution of chlorine dioxide and chlorine with said chlorine of increased partial pressure to cause an increase in the dissolved concentration of chlorine in said solution, and
    recovering the resulting chlorine-enriched aqueous solution of chlorine dioxide and chlorine.

2. The method of claim 1, wherein said gaseous mixture of chlorine dioxide and chlorine also contains steam and an inert gas, and said contact of said latter gaseous mixture with water causes condensation of said steam.

3. The method of claim 2, wherein said inert gas is air.

4. The method of claim 1 wherein said chlorine of increased partial pressure and said aqueous solution of chlorine dioxide and chlorine have substantially the same temperature.

5. A method of forming an aqueous solution of chlorine dioxide and chlorine from a gaseous mixture thereof, which comprises:
    feeding a gaseous mixture of chlorine dioxide, chlorine, steam and inert gas to a first gas-liquid contacting zone having a subatmospheric pressure,
    subjecting said gaseous mixture to countercurrent contact in said first contacting zone with water,
    condensing said steam by said countercurrent contact and dissolving the chlorine dioxide from said gaseous mixture in said water and the water formed by condensation of said steam, thereby providing a first aqueous solution of chlorine dioxide and chlorine and a first gaseous mixture of chlorine and inert gas,
    removing said first aqueous solution of chlorine dioxide and chlorine and said first gaseous mixture of chlorine and inert gas from said first contacting zone,
    compressing said first gaseous mixture of chlorine and inert gas to increase the partial pressure of chlorine in said gaseous mixture to a value exceeding that in said gaseous mixture of chlorine dioxide, chlorine, steam and inert gas and to provide a second gaseous mixture of chlorine and inert gas having a pressure equal to or less than atmospheric pressure,
    subjecting at least part of said first aqueous solution of chlorine dioxide and chlorine to countercurrent contact with at least part of said second gaseous mixture of chlorine and inert gas in a second gas-liquid contacting zone,
    dissolving chlorine from said second gaseous mixture of chlorine and inert gas in said first aqueous solution thereby providing a second aqueous solution of chlorine dioxide and chlorine having an increased dissolved chlorine content and a first gaseous mixture of chlorine dioxide, chlorine and inert gas,
    passing said first gaseous mixture of chlorine dioxide, chlorine and inert gas from said second gas-liquid contacting zone to said first gas-liquid contacting zone, and
    recovering said second aqueous solution from said second contacting zone.

6. The method of claim 5 wherein all said first aqueous solution of chlorine dioxide and chlorine is subjected to said countercurrent contact in said second contacting zone.

7. The method of claim 5 wherein part of said chlorine and inert gas in said second gaseous mixture of chlorine and inert gas is removed therefrom prior to said countercurrent contact in said second contacting zone.

8. The method of claim 5, wherein said second gaseous mixture of chlorine and inert gas is cooled prior to said countercurrent contact in said second contacting zone.

9. The method of claim 5, wherein said inert gas is air.

10. The method of claim 5, wherein part of said first aqueous solution of chlorine dioxide and chlorine is subjected to said countercurrent contact with said second gaseous mixture in said second contacting zone, and the remainder of said first aqueous solution of chlorine dioxide and chlorine is subjected to countercurrent contact with an inert gas in a third gas-liquid contacting zone to remove chlorine and chlorine dioxide therefrom at a temperature greater than the temperature of said first contacting zone to form a third aqueous solution of chlorine dioxide and chlorine having a reduced dissolved concentration of chlorine as compared to that in said first aqueous solution of chlorine dioxide and chlorine and a second gaseous mixture of chlorine dioxide, chlorine and inert gas, said second gaseous mixture of chlorine dioxide, chlorine and inert gas is fed to said first contacting zone, and said third aqueous solution of chlorine dioxide and chlorine is recovered from said third contacting zone.

11. The method of claim 5 including forming in a reaction zone a first gaseous mixture of chlorine dioxide, chlorine, steam and an inert gas from an acid aqueous reaction medium containing an alkali metal chlorate and a reducing agent and being maintained substantially at its boiling point at the absolute pressure thereon, maintaining said reaction zone under the same subatmospheric pressure as said first gas-liquid contacting zone, condensing steam from said first gaseous mixture of chlorine dioxide, chlorine, steam and inert gas to form a second gaseous mixture of chlorine dioxide, chlorine, steam and inert gas corresponding to said gaseous mixture fed to said first gas-liquid contacting zone, and feeding said first gaseous mixture of chlorine dioxide, chlorine and inert gas to said reaction zone whereby said first gaseous mixture of chlorine dioxide, chlorine and inert gas is passed to said first gas-liquid contacting zone in indirect manner.

12. The method of claim 11 including feeding part of said second gaseous mixture of chlorine and inert gas to said reaction zone.

13. The method of claim 5 wherein said first and second contacting zones have a temperature below about 50° F.

14. The method of claim 5 wherein said second gaseous mixture of chlorine and inert gas and said first aqueous solution of chlorine dioxide and chlorine have substantially the same temperature.

15. A method of forming an aqueous solution of chlorine dioxide and chlorine, which comprises:
feeding a gaseous mixture of chlorine dioxide, chlorine, steam and an inert gas to a first gas-liquid contacting zone having a subatmospheric pressure,
subjecting said gaseous mixture to countercurrent contact in said first contacting zone with a first aqueous solution of chlorine dioxide and chlorine,
condensing said steam by said countercurrent contact,
dissolving part of the chlorine dioxide from said gaseous mixture in said aqueous solution and the water formed by condensation of said steam, thereby providing a second aqueous solution of chlorine dioxide and chlorine having an increased proportion of chlorine dioxide as compared to said first aqueous solution of chlorine dioxide and chlorine and a first gaseous mixture of chlorine dioxide, chlorine and inert gas having a decreased proportion of chlorine dioxide as compared with said gaseous mixture of chlorine dioxide, chlorine, steam and inert gas,
removing said second aqueous solution of chlorine dioxide and chlorine from said first contacting zone,
passing said removed second aqueous solution of chlorine dioxide and chlorine to a second gas-liquid contacting zone having a pressure exceeding said subatmospheric pressure and equal to or less than atmospheric pressure,
subjecting said second aqueous solution of chlorine dioxide and chlorine to countercurrent contact with a gaseous mixture of chlorine and an inert gas containing a higher partial pressure of chlorine than said gaseous mixture of chlorine dioxide, chlorine, steam and inert gas in said second contacting zone to dissolve chlorine therein and remove chlorine dioxide therefrom, thereby forming a second gaseous mixture of chlorine dioxide, chlorine and inert gas and a third aqueous solution of chlorine dioxide and chlorine having an increased dissolved concentration of chlorine as compared to that of said second aqueous solution of chlorine dioxide and chlorine,
removing the second gaseous mixture of chlorine dioxide, chlorine and inert gas from said second gas-liquid contacting zone,
mixing said removed second gaseous mixture of chlorine dioxide, chlorine and inert gas with said first mixture of chlorine dioxide, chlorine and inert gas to form a third gaseous mixture of chlorine dioxide, chlorine and inert gas,
subjecting said third gaseous mixture of chlorine dioxide, chlorine and inert gas to countercurrent contact with water in a third gas-liquid contacting zone to dissolve substantially all the chlorine dioxide and part of the chlorine therefrom, thereby forming a fourth aqueous solution of chlorine dioxide and chlorine, and a gaseous mixture containing chlorine and an inert gas and being substantially free from chlorine dioxide,
passing said fourth aqueous solution of chlorine dioxide and chlorine from said third contacting zone to said first contacting zone as said first aqueous solution of chlorine dioxide and chlorine,
removing said gaseous mixture of chlorine and inert gas from said third contacting zone,
compressing said removed gaseous mixture of chlorine and inert gas to increase the partial pressure of chlorine therein to a value exceeding the partial pressure of chlorine in said gaseous mixture of chlorine dioxide, chlorine, steam and inert gas,
passing said compressed gaseous mixture to said second contacting zone as said gaseous mixture countercurrently contacting said second aqueous solution of chlorine dioxide and chlorine, and
recovering said third aqueous solution of chlorine dioxide and chlorine from said second contacting zone.

16. The method of claim 15, wherein said first and third gas-liquid contacting zones are constituted by a single vertically-extending gas-liquid contacting zone into which said gaseous mixture of chlorine dioxide, chlorine, steam and inert gas is fed at the bottom thereof and is allowed to rise in said single gas-liquid contacting zone, said water is fed at the top thereof and is allowed to fall in said single gas-liquid contacting zone, and said second gaseous mixture of chlorine dioxide, chlorine and inert gas is fed into the single gas-liquid contacting zone at a level between the top and bottom thereof to achieve said mixing to form said third gaseous mixture of chlorine dioxide, chlorine and inert gas at said level.

17. The method of claim 16, wherein said second gaseous mixture of chlorine dioxide, chlorine and inert gas is fed into the single gas-liquid contacting zone at a level at which the proportions of chlorine dioxide and chlorine in said second gaseous mixture is substantially the same as those in said single gas-liquid contacting zone at that level.

18. The method of claim 15 including separating a minor proportion of said chlorine in said compressed gaseous mixture of chlorine and inert gas prior to said passage to said second contacting zone.

19. The method of claim 15 wherein said compressed gaseous mixture is cooled prior to said passage to said second contacting zone.

20. The method of claim 15 wherein said inert gas is air.

21. A method of forming aqueous solutions of chlorine dioxide and chlorine having differing concentrations of chlorine dioxide and chlorine therein, which comprises:

feeding a gaseous mixture of chlorine dioxide, chlorine, steam and an inert gas to a first gas-liquid contacting zone having a subatmospheric pressure, subjecting said gaseous mixture to countercurrent contact in said first contacting zone with a first aqueous solution of chlorine dioxide and chlorine, condensing said steam by said countercurrent contact, dissolving part of the chlorine dioxide from said gaseous mixture in said aqueous solution and the water formed by condensation of said steam, thereby providing a second aqueous solution of chlorine dioxide and chlorine having an increased proportion of chlorine dioxide as compared to said first aqueous solution of chlorine dioxide and chlorine and a first gaseous mixture of chlorine dioxide, chlorine and inert gas having a decreased proportion of chlorine dioxide as compared with said gaseous mixture of chlorine dioxide, chlorine, steam and inert gas, removing said second aqueous solution of chlorine dioxide and chlorine from said first contacting zone, passing part of said removed second aqueous solution of chlorine dioxide and chlorine to a second gas-liquid contacting zone, subjecting said part of said second aqueous solution of chlorine dioxide and chlorine to countercurrent contact with an inert gas in said second contacting zone to remove chlorine and chlorine dioxide therefrom at a temperature greater than the temperature of said first contacting zone, thereby forming a second gaseous mixture of chlorine dioxide, chlorine and inert gas and a third aqueous solution of chlorine dioxide and chlorine having a reduced dissolved concentration of chlorine as compared to that of the second aqueous solution of chlorine dioxide and chlorine, removing the second gaseous mixture of chlorine dioxide, chlorine and inert gas from said second contacting zone, mixing said second gaseous mixture of chlorine dioxide, chlorine and inert gas with said first gaseous mixture of chlorine dioxide, chlorine and inert gas to form a third gaseous mixture of chlorine dioxide, chlorine and inert gas, the proportion of chlorine dioxide present in said first gaseous mixture and in said second gaseous mixture being substantially the same, subjecting said third gaseous mixture of chlorine dioxide, chlorine and inert gas to countercurrent contact with water in a third gas-liquid contacting zone having a subatmospheric pressure to dissolve substantially all the chlorine dioxide therefrom thereby forming a fourth aqueous solution of chlorine dioxide and chlorine and a gaseous mixture of chlorine and inert gas, passing said fourth aqueous solution of chlorine dioxide and chlorine from said third contacting zone to said first contacting zone as said first aqueous solution of chlorine dioxide and chlorine, passing the remainder of said removed second aqueous solution of chlorine dioxide and chlorine to a fourth gas-liquid contacting zone having a pressure exceeding said subatmospheric pressure and equal to or less than atmospheric pressure, subjecting said remainder of said second aqueous solution of chlorine dioxide and chlorine to countercurrent contact with a gaseous mixture of chlorine and an inert gas containing a higher partial pressure of chlorine than in said gaseous mixture of chlorine dioxide, chlorine, steam and inert gas in said fourth contacting zone to dissolve chlorine therein and remove chlorine dioxide therefrom, thereby forming a fourth gaseous mixture of chlorine dioxide, chlorine and inert gas and a fifth aqueous solution of chlorine dioxide and chlorine, removing fourth gaseous mixture of chlorine dioxide, chlorine and inert gas from said fourth gas-liquid contacting zone, compressing at least part of said removed gaseous mixture of chlorine and inert gas to increase the partial pressure of chlorine therein to a value exceeding the partial pressure of chlorine in said gaseous mixture of chlorine dioxide, chlorine, steam and inert gas, separating a minor proportion of said compressed gaseous mixture, passing the remainder of said compressed gaseous mixture to said fourth contacting zone as said gaseous mixture countercurrently contacting said remainder of said second aqueous solution of chlorine dioxide and chlorine, recovering said third aqueous solution of chlorine dioxide and chlorine from said second contacting zone, and recovering said fifth aqueous solution of chlorine dioxide and chlorine from said fourth contacting zone.

22. The method of claim 21, including feeding said removed fifth gaseous mixture of chlorine dioxide, chlorine and inert gas to said third gas-liquid contact zone for contact with water therein.

23. The method of claim 21, including forming in a reaction zone a first gaseous mixture of chlorine dioxide, chlorine, steam and an inert gas from an acid aqueous reaction medium containing an alkali metal chlorate and a reducing agent and being maintained substantially at its boiling point at the absolute pressure thereon, maintaining said reaction zone under the same subatmospheric pressure as said first gas-liquid contact zone, condensing steam from said first gaseous mixture of chlorine dioxide, chlorine, steam and inert gas to form a second gaseous mixture of chlorine dioxide, chlorine, steam and inert gas corresponding to said gaseous mixture fed to said first gas-liquid contacting zone, feeding said removed fifth gaseous mixture of chlorine dioxide, chlorine and inert gas to said reaction zone.

24. The method of claim 21, wherein said first and third contacting zones are constituted by a single vertically-extending gas-liquid contacting zone into which said gaseous mixture of chlorine dioxide, chlorine steam and inert gas is fed at the bottom thereof and is allowed to rise in said single contacting zone, said water is fed at the top thereof and is allowed to fall in said single contacting zone and said second gaseous mixture of chlorine dioxide, chlorine and inert gas is fed into the single contacting zone at a level between the top and bottom thereof to achieve said mixing to form said third gaseous mixture of chlorine dioxide, chlorine and inert gas at said level.

25. The method of claim 24, wherein said second gaseous mixture of chlorine dioxide, chlorine and inert gas is fed into the single contacting zone at a level at which the proportion of chlorine dioxide and chlorine in said second gaseous mixture is substantially the same as those in said single contacting zone at that level.

26. The method of claim 21, wherein said compressed gaseous mixture is cooled prior to passage to said fourth contacting zone.

27. The method of claim 21, wherein said inert gas is air.

28. The method of claim 21, wherein the temperature of operation of said second gas-liquid contacting zone is below about 50° F and about 5° to 10° F greater than the temperature of said water.

29. The method of claim 21 wherein said remainder of said compressed gaseous mixture and said remainder of said second aqueous solution of chlorine dioxide and chlorine have substantially the same temperature.

* * * * *